June 24, 1930.    J. W. BUGG    1,767,915
PERCOLATOR AND STRAINER
Filed Aug. 26, 1929
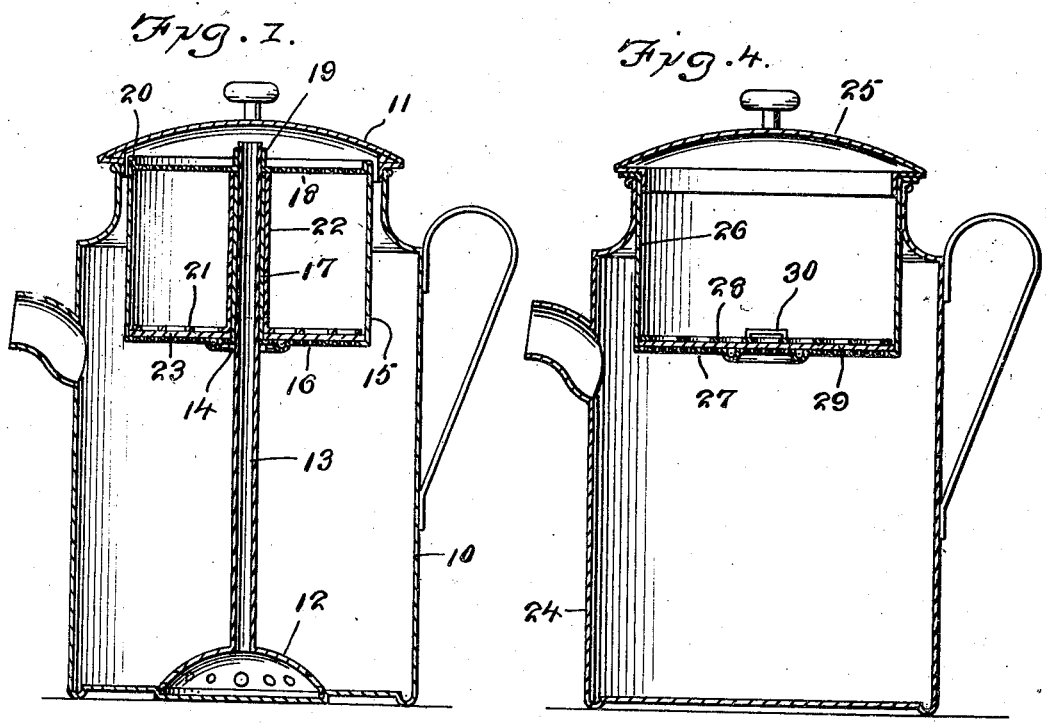
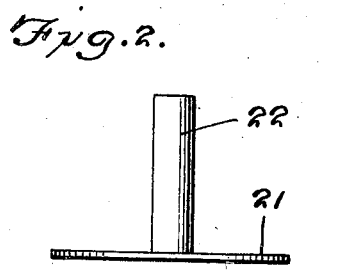
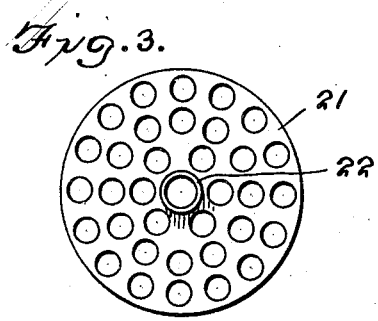
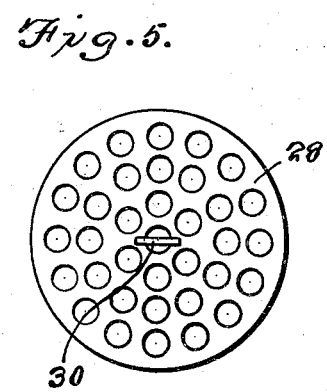

Patented June 24, 1930

1,767,915

UNITED STATES PATENT OFFICE

JOHN W. BUGG, OF COLUMBUS, GEORGIA

PERCOLATOR AND STRAINER

Application filed August 26, 1929. Serial No. 388,590.

This invention relates to strainers for use with coffee percolators, coffee urns, etc., an object being to provide a strainer which is cheap and simple in construction, will prevent the passage of fine coffee or extraneous matter from the coffee container into the pot or urn, and in addition may be readily taken apart for cleaning and thereafter readily assembled.

Another object of the invention is the provision of a strainer, by means of which drip coffee may be made without the annoyance and trouble of the usual bag.

With the above and other objects in view, the invention further includes the following novel features and details of construction, to be hereinafter more fully described, illustrated in the accompanying drawings and pointed out in the appended claims.

In the drawings:—

Figure 1 is a vertical sectional view through a percolator with the invention applied.

Figure 2 is a detail elevation of the removable filter holder.

Figure 3 is a plan view of the same.

Figure 4 is a sectional view similar to Figure 1 but illustrating a slightly modified form of the invention.

Figure 5 is a plan view of the filter holder shown in Figure 4.

Referring to the drawings in detail wherein like characters of reference denote corresponding parts, the reference character 10 indicates a coffee pot or like receptacle which is provided with a removable lid 11. Located within the pot is a percolator which includes a substantially dome-shaped perforated base 12, from which rises a hollow stem 13. This stem is provided with shoulders or abutments 14 which support a coffee container 15 whose sides are imperforate. The bottom of the container is provided with small apertures 16. A sleeve 17 has its lower end secured to the bottom of the receptacle 14 and is removably positioned around the stem 13, while a comparatively finely perforated cover 18 is provided for the coffee container. This cover rests upon the top edge of the container and upon the upper end of the sleeve 17, and is provided with a collar 19. The outer edge 20 of the cover is flanged as indicated so that the cover seats within the upper edge of the container.

Located within the coffee container 15 is a filter element holder which comprises a disk 21. This disk is provided with relatively large perforations and has extending upwardly therefrom a sleeve 22 which is removably positioned upon the sleeve 17 and has its upper end extending to the cover 18. A fabric or other suitable filtering element or cloth 23 is positioned between the bottom of the container 15 and the disk 21.

By reference to Figure 1 of the drawings it will be seen that liquid passing into the coffee container 15 must pass outward through the bottom of the container only, the sides of the container being inperforate. As the filtering element 23 covers the openings in the bottom 16, liquid from the container 15 must pass through this filtering element, so that finely ground coffee or other extraneous matter will be prevented from entering the coffee pot or receptacle.

The strainer may be readily taken apart for cleaning purposes, or for the renewal of the element, it being only necessary to wet this element and place the same upon the bottom of the disk 21 so that the filtering element will be smoothly and properly positioned.

The bottom of the coffee container 15 may be corrugated after the manner of the usual container for percolators.

In Figure 4, the invention is shown in connection with a receptacle 24 which may be used for drip coffee. In this form of the invention, the receptacle is provided with a cover 25, beneath which is positioned a coffee container 26. This container is provided with a perforated bottom 27 after the manner of the container 15 and a perforated disk or filtering element holder 28 is positioned within the container and acts to hold in place a cloth or other filtering element 29. The disk 28 is perforated after the manner of the disk 21 and is provided with a handle 30 for convenience in removing and replacing the disk.

The invention is susceptible of various changes in its form, proportions and minor details of construction and the right is herein reserved to make such changes as properly fall within the scope of the appended claim.

Having described the invention what is claimed is:—

In combination with a percolator having a hollow stem, a coffee container having a perforated bottom and imperforate side walls and a concentrically located sleeve mounted upon the stem and rising from the bottom of the coffee container, a second sleeve removably mounted upon the first mentioned sleeve, a perforated disk carried at the bottom of said sleeve, a filtering cloth removably positioned between the perforated disk and the bottom of the coffee container, and a perforated cover for the container.

In testimony whereof I affix my signature.

JOHN W. BUGG.